United States Patent [19]

Himes et al.

[11] Patent Number: 5,346,339
[45] Date of Patent: Sep. 13, 1994

[54] PIPELINE CLEANING PROCESS

[75] Inventors: Ronald E. Himes; Jeffrey A. Dahl; Charles V. Hunt; Marlin D. Holtmyer, all of Duncan, Okla.

[73] Assignee: Halliburton Company, Duncan, Okla.

[21] Appl. No.: 78,930

[22] Filed: Jun. 16, 1993

[51] Int. Cl.$^5$ ............................. F16L 1/04; B08B 9/04
[52] U.S. Cl. ........................................ 405/171; 134/8; 405/158; 405/169
[58] Field of Search ............... 405/169, 170, 171, 158; 166/305.1, 308, 294, 295, 300; 15/104.06; 134/4, 8, 22.11, 22.14

[56] References Cited

U.S. PATENT DOCUMENTS

| | | |
|---|---|---|
| 3,523,826 | 8/1970 | Lissant . |
| 3,978,678 | 9/1976 | Duncan et al. ........................ 405/171 |
| 4,011,620 | 3/1977 | Southgate ........................ 405/171 X |
| 4,216,026 | 8/1980 | Scott . |
| 4,252,465 | 2/1981 | Broussard et al. . |
| 4,360,290 | 11/1982 | Ward ........................ 405/169 X |
| 4,379,722 | 4/1983 | Scott ........................ 405/171 X |
| 4,389,461 | 6/1983 | Scott . |
| 4,416,703 | 11/1983 | Scott . |
| 4,451,389 | 5/1984 | Clear . |
| 4,486,335 | 12/1984 | Majewicz . |
| 4,493,589 | 1/1983 | Ward ........................ 405/166 X |
| 4,543,131 | 9/1985 | Purinton, Jr. . |
| 4,982,793 | 1/1991 | Holtmyer et al. . |
| 5,067,565 | 11/1991 | Holtmyer et al. . |
| 5,122,549 | 6/1992 | Holtmyer et al. . |

Primary Examiner—Dennis L. Taylor
Attorney, Agent, or Firm—Robert A. Kent

[57] ABSTRACT

The present invention provides a method of cleaning a pipeline using a gel pig of a graft copolymer of a hydroxyalkyl cellulose prepared by a redox reaction with vinyl phosphonic acid. The gel pig is formed by hydrating the graft copolymer in an aqueous liquid. The gel pig is crosslinked by the addition of a Lewis base or Bronsted-Lowry base, to the gel in an amount sufficient to initiate crosslinking of the graft copolymer. Contaminants entrained in the crosslinked gel pig during the cleaning process may be separated by the addition of a pH reducing agent to the pig whereby the viscosity of the gel is caused to decrease. The gel may be used for further cleaning after contaminant separation by addition of an additional quantity of the Lewis base or Bronsted-Lowry base.

19 Claims, No Drawings

PIPELINE CLEANING PROCESS

BACKGROUND OF THE INVENTION

The present invention provides a method for cleaning a pipeline containing particulate matter or other solids debris utilizing a novel crosslinked aqueous gel comprising select copolymers of cellulose ether derivatives.

Numerous methods exist to effect cleaning of the interior of a pipeline of scale and other debris. Mechanical pigs and gelled chemical pigs have been used to remove the scale and other debris. The mechanical pigs are normally solid somewhat bullet shaped devices with rubber baffles, wire brushes or abrasive surfaces to physically scrape the scale and debris from the pipe. The gelled chemical pigs, on the other hand, generally remove the debris by entrainment as the gelled fluid passes through the pipeline.

Various processes utilizing chemical pigs for pipeline cleaning are disclosed in, for example, U.S. Pat. Nos. 3,523,826; 4,216,026; 4,252,465; 4,389,461; 4,416,703 and 4,543,131 and the numerous patents identified therein. The various processes utilize chemical pigs formed from various gelled fluids or emulsions to pick up and carry debris in the pipeline from a point of injection to a point of ultimate recovery. The recovered chemical pigs containing the debris then are broken to separate the debris and permit disposal of the chemical pig. The chemical pigs generally are incapable of reuse after removal from the pipeline. In many instances, due to the limited ability of the chemical pigs to continuously support large quantities of debris as it is collected within a pipeline, large quantities of the chemical pigs must be utilized to ensure that the debris is picked up and maintained at a concentration that can be satisfactorily removed by the chemical pig. Alternatively, a quantity of a debris laden chemical pig is passed through a pipeline to a predetermined location whereupon it is removed and replaced with a new chemical pig to remove additional debris.

It would be highly desirable to provide a gelled fluid pig that could be utilized to remove solid debris from a pipeline, the debris be removed from the fluid and the fluid be utilized to remove additional debris.

Such a fluid would possibly permit smaller fluid volumes to be utilized, multiple uses of the fluid and decreased disposal costs since less overall fluid ultimately must be disposed of upon completion of the cleaning process.

SUMMARY OF THE INVENTION

The surprising discovery now has been made of a novel gelled fluid which can be crosslinked, uncrosslinked and recrosslinked upon successive changes in the pH of the fluid permitting the formation of a gelled fluid pig for pipeline cleaning from which accumulated debris can readily be removed and the gelled fluid can be subjected to multiple uses before disposal. The novel gelled fluid comprises an admixture of an aqueous fluid containing at least a trace amount of at least one divalent cation and certain graft copolymers of hydroxyethyl or hydroxypropyl cellulose, prepared by a redox reaction with vinyl phosphonic acid monomers or polymers and hydroxyethyl or hydroxypropyl cellulose. The gelled fluid can be crosslinked by the addition of a Lewis base or Bronsted-Lowry base or mixture of such bases to the aqueous solution containing the graft copolymer. The base utilized is generally substantially free of polyvalent metal ions. The crosslinked gel formed has sufficient viscosity to readily pick up and transport debris encountered in a pipeline cleaning process. The viscosity of the crosslinked gelled fluid may be reduced to permit separation of at least a portion of the debris by reducing the pH of the gelled fluid. Thereafter, the fluid may be re-crosslinked by the addition of an additional quantity of a Lewis base or Bronsted-Lowry base or mixture of such bases. The crosslinked gelled fluid ultimately may be degraded to form a substantially aqueous fluid which contains no significant quantity of water insoluble residue.

Description Of The Preferred Embodiments

The present invention provides a method of crosslinking an aqueous solution of a polymer derivative comprising a graft copolymer of hydroxyethyl cellulose or hydroxypropyl cellulose and a method of pipeline cleaning utilizing such crosslinked aqueous gels.

An aqueous liquid is used to solubilize the novel copolymer of the present invention. The term "aqueous liquid" is used hereafter to mean any liquid containing sufficient water to at least partially hydrate the copolymer and result in an increase in the viscosity of the fluid. Aqueous liquids may comprise, for example, fresh water, brine, alcohol-water mixtures and the like. The pH of the aqueous liquid should be compatible with the selected crosslinking agent and must not adversely affect the hydration of the copolymer.

In one embodiment of the present invention, the crosslinkable copolymers are prepared by reacting certain vinyl monomers comprising vinyl phosphonic acid (VPA), with a cellulose derivative using a redox system comprising ceric ions and nitric acid. The generalized reaction is believed to be represented by the formula:

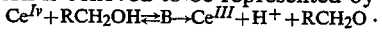

where B is the ceric-alcohol complex, $RCH_2OH$ is the cellulose derivative and $RCH_2O\cdot$ is a free radical. Graft copolymerizations of cellulose commonly use chemical initiators, such as ceric ions. In acid media, ceric ions oxidize 1,2-glycols with the formation of a free radical on a reducing agent, which is the cellulose derivative in this case. The free radical produced on the cellulose derivative initiates polymerization with the vinyl group of the monomer to produce the graft copolymer.

The cellulose derivative of this invention is preferably a hydroxyalkyl cellulose having a hydroxyalkyl molar substitution from about 1.5 to about 3.0. Molar substitution is defined as the average number of moles of a substituent group present per anhydroglucose unit of the cellulose material. The alkyl group is selected from the group of ethyl, propyl and mixtures thereof. The preferred hydroxyalkyl cellulose is hydroxyethyl cellulose (HEC) having a molar substitution in the range of about 1.8 to about 2.5. Preferably in this invention, the hydroxyalkylation of the cellulose is performed in a separate reaction. Hydroxyethyl cellulose is usually formed by reacting ethylene oxide with cellulose under extreme alkaline conditions and is available commercially.

The copolymers of the present invention are rendered crosslinkable by grafting monomers comprising a vinyl phosphonic acid to the cellulose derivative. The monomers have the reactive

moiety that is believed to enable the monomer to attach to the cellulose derivative.

Typically, graft copolymerizations are carried out in aqueous media wherein the polymer is dissolved or dispersed. Copolymers of this invention were prepared in acetone (55% to 90%) and water (45% to 10%) or methanol (about 70%) and water (about 30%) as well as other fluids. Reactions were carried out in a 1 liter kettle with a stirrer or a 1 liter jar at about 20° C. to about 60° C. The ratio of cellulose derivative to aqueous medium ranges from about 1 gram per 100 ml. to about 1 gram per 2 ml. The preferred ratio is from about 1 gram per 6 ml. to 1 gram per 4 ml. The ratio of cellulose derivative to grafting VPA monomer ranges from about 3 grams per 1 ml. to about 25 grams per 1 ml. The preferred ratio is from about 6 grams per 1 ml. to about 16 grams per 1 ml.

The polymerization reaction of the present invention may be chemically initiated by a redox system comprising, for example, ceric ions in acidic medium. Ceric ions may be provided, for example, by salts such as ceric nitrate, ceric sulfate, ceric ammonium nitrate and ceric ammonium sulfate. The preferred ceric initiator of the present invention is a solution of ceric ammonium nitrate in 1N nitric acid. Ceric ammonium nitrate is present in an amount of from about 0.00075 mole/100 ml. to about 0.005 mole/100 ml. reaction medium.

The ceric initiator may be added slowly to the reaction material over a time period of about 30 to 90 seconds or longer. Reaction times vary from about 10 minutes to 20 hours depending on reaction conditions or the particular grafting monomer. Grafting reaction efficiency is generally less than about 50%. After the reaction is complete, the polymerization product is washed with acetone, filtered and dried.

In another embodiment of the present invention, the crosslinkable copolymers are prepared by reacting certain vinyl monomers having a crosslinkable substituent with a cellulose derivative using a redox system comprising, for example, the reaction product of hydrogen peroxide with a ferrous salt. The generalized redox reaction is believed to be represented by the formula:

and the generalized initiation reaction is believed to be represented by the general formula:

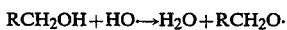

An advantage of this initiator is that radical production occurs at a reasonable rate over a wide temperature range whereby reactions can be carried out at room temperature, if desired. The free radical produced on the cellulose derivative initiates polymerization with the vinyl group of the monomer to produce the graft copolymer.

Typically, the graft copolymerization is carried out in aqueous media wherein the polymer is partially dissolved or dispersed. Copolymers were prepared in acetone/water mixtures containing from about 55 to about 90% acetone. Reactions were carried out in a 1 liter kettle with a stirrer or a 1 liter jar at a temperature of from about 20 to about 60° C. The ratio of cellulose derivative to aqueous medium ranges from about 1 gram per 100 ml. to about 1 gram per 2 ml. The preferred ratio is from about 1 gram per 2 to 5 ml. The ratio of cellulose derivative to grafting VPA monomer ranges from about 5 to about 40 grams per 1 gram of monomer. The preferred ratio is from about 6 to about 16. It is to be understood that the ranges set forth above are merely exemplary and that other temperatures, concentrations and the like maybe utilized to prepare the reaction product.

The polymerization reaction of this embodiment of the invention is chemically initiated by a redox system comprising the reaction product of hydrogen peroxide with a ferrous salt. Ferrous ions may be provided, for example, by salts such as ferrous ammonium sulfate, ferrous chloride, ferrous sulfate, ferrous acetate, ferrous oxalate, ferrous acetylacetonate and the like. A preferred source of ferrous ions is ferrous ammonium sulfate. Alternatively, other commonly used metal ion reductants may be utilized in place of the ferrous ions to generate the free radicals necessary to effect grafting and other forms of hydrogen peroxide such as t-butylhydroperoxide may be used.

The initiator may be added slowly to the reaction material over a time period of about 30 to 90 seconds or longer. Reaction times vary from about 15 minutes to about 4 hours depending upon the reaction conditions or the particular grafting monomer. Grafting reaction efficiency (% of monomer grafted) is generally less than about 75%. After the reaction is complete, the copolymerization product is washed with acetone, filtered and dried.

In a preferred method of effecting the graft copolymerization, the grafted polymer product is retained in a substantially storage stable slurry form. Typically, the media comprises a polyglycol, such as polypropylene glycol having molecular weights up to about 1000 such as PPG-250 to PPG-1000 from Texaco Chemical Co., various polyethylene glycols and homopolymers of 1,2-butylene oxide having a molecular weight of from about 200 to about 400 which are present in an amount of from about 70 to about 95 percent by weight of the media and the remainder generally being water. The media also may comprise tetramethylammonium chloride in a similar amount or in admixture with a polyglycol. In a preferred embodiment the polyglycol comprises from about 86 to 92 percent of the media. Reactions were carried out in a 5 liter kettle with a stirrer at a temperature of from about 20 to 60° C. The ratio of cellulose derivative to media ranges from about 1 gram per 1000 ml to about 1 gram per 2 ml. The preferred ratio is from about 1 gram per 2 to 5 ml. The reaction media also may include a quantity of a dispersant or thixotrope such as alkyl quaternary ammonium montmorillonite (Claytone AF from E.C.C. America, Inc.) or dimethyldicocoammonium chloride to facilitate dispersion of the polymer in the media and improve suspension properties. The grafting reaction is performed as previously described using an appropriate redox system such as the ferrous salt with a source of peroxide. Since the metal ions are not removed from the product by washing as when a dry product is formed, a sequestrant for the metal ions may be added to the slurry at the conclusion of the reaction to facilitate subsequent hydration of the polymer. The polymerization product has been found to remain readily dispersible or suspended in the slurry form over a period of time to facilitate storage and handling.

Graft copolymers of the present invention solubilize in aqueous liquids and substantially increase the viscosity of aqueous liquids. The viscosity of the copolymer solution may be further increased with the addition of a selected crosslinking activators or agents which effect an initiation of a crosslink interaction. Preferred crosslinking activators or agents in accordance with this invention comprise Bronsted-Lowry or Lewis bases which generally are substantially free of polyvalent metal ions, that is, metal ions having more than one valence state. Suitable compounds include, for example, calcium oxide, magnesium oxide and compounds selected from mono, di and trialkanol amines such as triethanolamine, sodium hydroxide, potassium hydroxide, ammonia, various cocoamines such as Bis(2-hydroxyethyl) cocoamine, various pentamines such as tetraethylenepentamine and various other water soluble amines, such as propyldiethanolamine, triethylamine, various water soluble borates such as the commercially available product Polybor, an admixture of boric acid and borate salts, from U.S. Borax and the like in the presence of a divalent cation, such or magnesium or calcium, which is present in at least a trace amount and which may be present in the aqueous liquid utilized to hydrate the copolymer or added as an additional component to the aqueous liquid. Such compounds are substantially free of polyvalent metal ions. A particularly preferred crosslinking activator or agent is magnesium oxide. As a result of the limited solubility of magnesium oxide in an aqueous solution, the rate of crosslink development is retarded or delayed such that a gelled fluid can be readily pumped into a pipeline before significant crosslinking occurs in the fluid.

While the specific mechanism by which the crosslinking occurs is unknown, it is believed that the crosslink is formed through the phosphorus moiety in the graft copolymer which is activated by the presence of the Lewis or Bronsted-Lowry base.

While the following description will be directed to the use of magnesium oxide as a crosslinking agent, it is to be understood that the described method would apply generally to any of the other suitable crosslinking agents of the present invention. A base gel is prepared by hydrating the previously described graft copolymer of hydroxyethyl cellulose or hydroxypropyl cellulose, in an aqueous fluid at a pH in the range of from about 0.1 to about 3.5. The graft copolymer can be admixed with the aqueous fluid in an amount of from about 10 to about 300 pounds per 1000 gallons of fluid. After the gelling agent has substantially hydrated, the base gel is admixed with a quantity of magnesium oxide as it is introduced into the pipeline.

The mixing can be effected in substantially any conventional mixing apparatus. The magnesium oxide generally is admixed with the base gel in an amount of from about 3 to about 40 pounds per 1000 gals of base gel. In a preferred method of addition, the magnesium oxide is added as an aqueous slurry to facilitate handling of the material.

The fluid also may contain conventional additives such as gel stabilizers, corrosion inhibitors, scouring agents such as sand and the like which do not adversely react with the fluid to prevent its use in the desired manner.

Preparation of the pig in this manner facilitate placement at convenient low pressures in the pipeline. The pig forms a crosslinked gel after it enters the pipeline and conforms to the general shape and size of the pipeline.

After the pig has been formed in the pipeline, it is normally driven through the pipeline by the driving force of a fluid under pressure. This fluid may be a gas or a liquid and will vary depending upon the needs of the user. For example, if the user wishes to leave the pipeline in a dry, empty state, one would normally use a dry inert gas, such as nitrogen, carbon dioxide, ethane, propane, liquified petroleum gas, or the like. If the user desires to refill the pipeline with a product, the pig could be driven with a liquid product, such as crude oil, gasoline, or the like, so long as the product did not adversely affect the properties of the pig before its job is complete or substantially complete. In many instances the user may want the line cleaned, passivated and filled with fresh water for temporary "storage" of the line such as a preoperational cleaning.

Normally the pigs are formulated and used at ambient temperatures or below and are pumped through the pipelines at pressures sufficient to move the pig at a reasonable rate. Temperatures generally are normally below about 140° F. Pressures are normally below about 1500 psig. The predominant number of pipelines will normally be cleaned at pressures less than 500 psig. Linear flow rates of up to about 10 feet/second are satisfactory from a commercial cleaning standpoint. However, linear flow rates of up to about 5 feet/second are generally preferred and rates of from about 0.75 to about 1.25 feet/second are most preferred.

The size and shape of the pipeline is basically irrelevant because the gelled pigs are able to be pumped for prolonged distances and their shapes adjusted to fit the size of the pipeline during conditions of use. This makes the gelled pig extremely effective because stalactites and stalagmites in the pipeline do not cause its destruction by ripping and tearing it apart as they do solid mechanical pigs.

The aqueous gelled pigs can be used alone or as an element of a pig train in the pipeline cleaning process. the latter instance, the aqueous gelled pig is preceded and/or followed by other chemical pig segments or mechanical pigs. Such chemical pig segments can be of the same or different compositions and can include various additives such as corrosion inhibitors, bactericides, passivation agents, scouring agents and the like. These chemical segments are usually liquid or gels.

For example, a pig train can be formed having an aqueous gelled pig according to the instant invention as the leading segment followed by a bactericide-containing aqueous-based gelled pig. This combination can be very effective in cleaning and sanitizing pipelines. As another example, a pig train having an aqueous gelled pig according to the instant invention is the leading segment followed by a mobility buffer comprising a non-crosslinked gelled alkanol of from 1 to 3 carbon atoms followed by a desiccating amount of a liquid alkanol of from 1 to 3 carbon atoms can be very effective in drying pipelines. As another example, a pig train can be formed having aqueous crosslinked gelled pigs of the present invention as the leading and trailing segments of the pig train sandwiching in a gelled organic solvent such as kerosene, perchlorethylene, toluene, or the like. This embodiment of having a pig train with one or more chemical pig segments sandwiched between aqueous crosslinked gelled pigs of the present invention is a preferred embodiment when there is a need to clean a line filled or partially filled with liquid and/or to use a liquid under pressure as the driving force for the pig train. Mechanical pigs such as scrapers, swabs, squeegees, spheres, or the like can also be advantageously included in the pig train in many instances. For example, one can include scraper pigs to dislodge scale and debris to be subsequently picked up and carried by an aqueous gel of the present invention. As another example, squeegee pigs comprising foamed polyurethane can be included to physically separate chemical pig segments in the pig train and/or included as the trailing segment of the train. When the driving force for the pig train is a gas under pressure it is advantageous to use one or more squeegee pigs at the end of the pig train to help prevent fluid by-pass which is a potential problem, particularly in convoluted lines. Pig trains of multiple segments are envisioned and embodied in the scope of the present invention.

After the aqueous crosslinked gel pig of the present invention has passed through a portion of or the entirety of a pipeline it may be treated with a pH reducing agent to reduce the pH of the gel to a level such that the viscosity decreases and entrained solids debris will readily separate by gravity settling or simple filtration. The pH reduction can be effected by addition of, for example, a quantity of a mineral acid such as hydrochloric acid, an organic acid such as fumaric acid, acetic acid, citric acid, polyhydroxyacetic acid and the like or encapsulated forms of acid generating compounds or acids and the like. Upon separation of at least a portion of the debris, such as by filtration, screening or settling, the aqueous gel pig can be caused to recrosslink by the addition of a further quantity of the crosslinking agent. The gel then may be utilized for further pipeline cleaning as previously described. The crosslinked gel exhibits no detrimental effects from the reduction in viscosity followed by recrosslinking and the process may be repeated multiple times.

The following examples are provided to illustrate the utility of the composition of the present invention, however the invention is not to be considered as limited by these examples.

EXAMPLE I

To a 5 liter round bottom kettle, equipped with a stirrer, temperature controller and a $N_2$ sparge tube, the following reactants were added, about 2380 grams of PPG-400 (polypropyleneglycol from Texaco Chemical Co.) and about 60 grams Claytone AF (alkyl quaternary ammonium montmorillonite from E.C.C. America, Inc.). The mix is stirred and nitrogen gas sparging is begun. Thereafter 1079 grams of hydroxyethyl cellulose (MS of about 2.2) is added and heating is initiated to slowly raise the temperature to about 40° C. (generally 30 minutes to 1 hour). After temperature is reached, the temperature is maintained for about 1 hour to remove oxygen contamination.

While the above mixture is being heated about 319 grams of deionized water are admixed with about 10.5 grams of ferrous ammonium sulfate (reagent grade) in an erlenmeyer flask, while sparging, and dissolved. To this mixture is added about 121 grams of vinyl phosphonic acid from Hoechst Celanese Corporation and mixing and sparging is continued until the materials are dissolved. The solution then is added at the end of the sparging period to the 5 liter kettle.

The temperature is maintained while stirring and sparging and after about 1 hour 17.3 grams of 70% t-butylhydroperoxide is added to the kettle which then is allowed to react for about an hour. After the reaction is completed, a sequestrant, such as DEQUEST ®2010 from Monsanto Company, is added to the slurry to sequester the metal ions present and stirred. The reaction mixture then is permitted to cool. The reaction produced a 30% active polymer slurry.

A one (1) liter sample is prepared by mixing a sufficient quantity of the polymer with tap water to yield a 120 pound/1000 gallon solution of the polymer of the present invention. To facilitate hydration, sufficient acid, such as 15% hydrochloric acid, is admixed with the solution to correspond to about 10 gallons per 1000 gallons of solution. The acid may be omitted or lesser quantities may be used if slower hydration is acceptable or desired. It is to be understood that other acid concentrations also could be utilized.

After being permitted to hydrate to form a gel, the gel is admixed with the equivalent of about 15 pounds/1000 gallons of magnesium oxide in the form of an aqueous slurry and a sample is evaluated with a FANN Model 35 ® viscometer. The pH of an aliquot sample also is monitored. The viscometer is equipped with a #1 spring, standard bob and sleeve. The results of the test are set forth below in Table I.

TABLE I

| Time Minutes | Viscometer Dial Reading at 5.11 $S^{-1}$ | pH |
|---|---|---|
| 1 | 18 | 1.98 |
| 5 | 18 | 5.28 |
| 6 | 18 | 5.70 |
| 7 | 19 | 5.98 |
| 8 | 20 | 6.17 |
| 9 | 22 | 6.30 |
| 10 | 23 | 6.41 |
| 11 | 25 | 6.50 |
| 12 | 27 | 6.57 |
| 13 | 29 | 6.63 |
| 15 | 33 | 6.74 |
| 20 | 51 | 6.92 |
| 25 | 70 | 7.06 |
| 30 | 93 | 7.17 |

The results clearly demonstrate the crosslink development upon addition of the base to the gelled fluid. The above test is repeated utilizing a 9 pound per gallon density $CaCl_2$ brine instead of tap water. The results of the test are set forth in Table II, below.

TABLE II

| Time Minutes | Viscometer Dial Reading at 5.11 $S^{-1}$ | pH |
|---|---|---|
| 1 | 27 | 1.5 |
| 2 | 28 | 3.35 |
| 3 | 27 | 4.29 |
| 4 | 35 | 4.79 |
| 5 | 60 | 5.09 |
| 6 | 160 | 5.29 |
| 7 | 260 | 5.44 |

EXAMPLE II

To further demonstrate the crosslinkability of the gelled fluids of the present invention with various bases, the following tests were performed.

A polymer solution corresponding to 120 pounds per gallons of fluid was prepared. The aqueous fluid used was either 2% KCl solution prepared with water containing divalent cations or 9 pound per gallon density $CaCl_2$ brine. The polymer was hydrated by two different methods. Hydration method I comprised the addition of the gelling agent to a quantity of aqueous fluid followed by addition of further quantities of aqueous fluid during mixing. Hydration method II was the same as 1 with the addition of a quantity of 15% HCl equivalent to 10 gallons/1000 gallons of solution to accelerate the rate of hydration. Quantities of various bases then were admixed with the gel in order to determine the crosslinkability. The results are set forth in Table III, below.

TABLE III

| Base | Quantity, gallon per 1000 gallon | Aqueous Fluid | Gel Orig. pH | Gel Final pH | Gel Hydration Method | Comments |
|---|---|---|---|---|---|---|
| Triethanol Amine | 2 | 9#/gal CaCl$_2$ | 1.98 | 4.5 | II | Crosslinked |
| Triethanol Amine | 2 | 9#/gal CaCl$_2$ | 3.05 | 6.04 | I | Crosslinked |
| Triethanol Amine | 2 | 2% KCl | 2.62 | 7.03 | II | Crosslinked |
| Tetra-ethylene-pentamine | 2 | 9#/gal CaCl$_2$ | 3.0 | 8.5 | I | Crosslinked |
| Bis (2-hydroxyethyl) cocoamine | 6 | 9#/gal CaCl$_2$ | 3.0 | 5.52 | I | Crosslinked |
| Polybor | 30#/1000 gallon | 9#/gal CaCl$_2$ | 3.0 | 5.97 | I | Crosslinked |
| None | 0 | 9#/gal CaCl$_2$ | 3.0 | 3.0 | I | No Crosslink |
| None | 0 | 9#/gal CaCl$_2$ | 1.98 | 1.98 | II | No Crosslink |

EXAMPLE III

To demonstrate the recrosslinking capability of the gelled fluids of the present invention with a change in pH of the fluid, the following tests were performed.

A polymer solution corresponding to 20 pounds per 1000 gallons of fluid was prepared. The aqueous fluid utilized was a 2% NH$_4$Cl solution. Hydration was accelerated by the addition of the equivalent of 10 gallons of 15% HCl per 1000 gallons of fluid. The initial pH and viscosity then were recorded. A quantity of MgO then was admixed with the gel in an amount equivalent to 15 pounds per 1000 gallons of fluid. The change in viscosity and pH then was monitored until such time that a quantity of fumaric acid equivalent to 10 pounds per 1000 gallons of fluid was admixed with the gel. The effect of the addition was monitored after which a further quantity of MgO equivalent to the initial addition was admixed with the gel and the viscosity monitored. The results are set forth in Table IV, below.

TABLE IV

| Time, Minutes:Seconds | Comments | pH | Viscometer dial reading at 511 sec$^{-1}$ |
|---|---|---|---|
| 0 | | 1.67 | 9 |
| | added MgO | | |
| 1:15 | | 2.4 | 9 |
| 2:05 | | 3.0 | 9 |
| 2:37 | | 4.0 | 9 |
| 2:51 | | 5.5 | 9 |
| 3:00 | | 6.0 | 9 |
| 3:28 | | 6.5 | 10 |
| 4:02 | | 7.0 | 13 |
| 5:42 | | 7.5 | 18 |
| 8:55 | | 8.0 | 22 |
| 20:03 | | 8.5 | 44 |

TABLE IV-continued

| Time, Minutes:Seconds | Comments | pH | Viscometer dial reading at 511 sec$^{-1}$ |
|---|---|---|---|
| | added fumaric acid | | |
| 21:03 | | 8.0 | 14 |
| 22:01 | | 7.0 | 10 |
| 22:25 | | 5.0 | 9 |
| 24:03 | | 4.8 | 9 |
| | Added MgO | | |
| 25:33 | | 8.0 | 20 |
| 26:48 | | 8.5 | 43 |

The results clearly illustrate the recrosslinkability of the aqueous gel of the present invention.

While that which is believed to comprise preferred embodiments of the invention have been described herein, it is to be understood that changes or modifications in the method may be made by individuals skilled in the art without departing from the spirit or scope of the invention as set forth in the appended claims.

What is claimed is:

1. A method of cleaning the interior of a pipeline comprising passing a crosslinked cellulose ether, derivative gel pig through said pipeline, said pig being prepared by:

admixing a cellulose ether derivative comprising a reaction product produced by the reaction of a hydroxyalkyl cellulose having a molar substitution of from about 1.5 to about 3, the alkyl being selected from the group of ethyl and propyl with a vinyl phosphonic acid in the presence of a redox system at a temperature in the range of from about 20 to about 60° C. with a sufficient quantity of an aqueous fluid containing at least a trace amount of at least one divalent cation to form a base gel;

admixing a sufficient quantity of a crosslinking activator comprising a Lewis base or Bronsted-Lowry base with said base gel to initiate crosslinking of said base gel; and introducing said base gel containing the crosslinking activator into said pipeline in amounts and at a rate sufficient to remove contaminants from the interior of said pipeline.

2. The method of claim 1 wherein sufficient base is admixed with said base gel to raise the pH of the base gel.

3. The method of claim 1 defined further to include the steps of: removing the crosslinked gel from said pipeline; reducing the viscosity of the gel by reducing the pH of said gel, removing at least a portion of said contaminants from said gel; and, adding an additional quantity of said crosslinking activator to said gel in an amount sufficient to recrosslink said gel after which it is reintroduced into said pipeline to effect additional contaminant removal.

4. The method of 1 wherein said base is magnesium oxide.

5. The method of claim 1 wherein said base comprises at least one member selected from the group of magnesium oxide, mono, di or trialkanol amines, calcium oxide, sodium hydroxide, potassium hydroxide, ammonia, cocoamines, pentamines, alkyldiethanol amines, an admixture of boric acid and borate salts, and diethylamine.

6. A method of cleaning the interior of a pipeline comprising:

preparing an aqueous crosslinked gel pig by admixing (i) an aqueous liquid containing at least a trace amount of at least one divalent cation with (ii) a polymer derivative that is chemically modified by reacting at least one member selected from the group of hydroxyethyl cellulose and hydroxypropyl cellulose with a vinyl phosphonic acid in the presence of a redox system and (iii) a sufficient quantity of crosslinking activator comprising a Lewis base or a Bronsted-Lowry base to initiate crosslinking of said polymer derivative;

introducing said aqueous crosslinked gel pig into a pipeline while crosslinking of said gel is occurring and thereafter passing said crosslinked gel pig through said pipeline at a rate sufficient to remove contaminants from the interior of said pipeline, reducing the pH of said crosslinked gel pig whereby the viscosity is reduced and at least a portion of said contaminants separate from said gel pig; and admixing an additional quantity of said crosslinking activator with said gel pig whereby at least a portion of said polymer derivative in said gel pig is caused to recrosslink.

7. The method of claim 6 wherein said chemical modification of said polymer is defined further as reacting said member with a vinyl phosphonic acid in a reaction media comprising at least one member selected from the group of tetramethylammonium chloride, polyethylene glycol and polypropylene glycol to which a redox initiator is added.

8. The method of claim 7 defined further to include a dispersant in said reaction media.

9. The method of claim 8 wherein said dispersant comprises at least one member selected from the group of alkyl quaternary ammonium montmorillonite and dimethyldicocoammonium chloride.

10. The method of claim 7 wherein said reaction is defined further to be performed at a temperature in the range of from about 20 to about 60° C.

11. The method of claim 6 wherein said crosslinking agent comprises magnesium oxide.

12. The method of claim 6 wherein said crosslinking activator comprises at least one member selected from the group of magnesium oxide, mono, di or trialkanol amines, calcium oxide, sodium hydroxide, potassium hydroxide, ammonia, cocoamines, pentamines, alkyldiethanol amines, an admixture of boric acid and borate salts, and diethylamine.

13. The method of claim 6 wherein said redox system comprises a peroxide and a metal ion reductant.

14. The method of claim 12 wherein said metal ion reductant comprises a source of ferrous ions.

15. A method for cleaning the interior of a pipeline utilizing a cellulose ether derivative comprising:

preparing a pig comprising a base gel, by admixing an aqueous liquid containing at least a trace amount of at least one divalent cation with a cellulose ether derivative that is chemically modified by reacting a hydroxyalkyl cellulose with a vinyl phosphonic acid in the presence of a redox system;

admixing a sufficient quantity of a crosslinking activator comprising a Lewis base or Bronsted-Lowry base, with said base gel to initiate crosslinking of said gel pig; and introducing said gel pig containing said crosslinking activator into a pipeline;

passing said crosslinked gel pig through said pipeline at a rate sufficient to remove and entrain contaminants from the interior of said pipeline;

reducing the pH of said crosslinked gel pig by the addition of a sufficient quantity of a pH reducing agent to result in a reduction in the viscosity of said crosslinked gel pig whereby at least a portion of said entrained contaminants are caused to be separated therefrom; and admixing an additional quantity of a crosslinking activator with said gel pig having at least a portion of said contaminants separated therefrom whereby said gel is cause to recrosslink.

16. The method of claim 15 wherein said gel pig is preceded or followed by at least one mechanical pig in said pipeline.

17. The method of claim 15 wherein said chemical modification of said cellulose ether is defined further as reacting a hydroxyalkyl cellulose having a molar substitution of from about 1.5 to about 3, said alkyl being selected from the group of ethyl and propyl, with a vinyl phosphonic acid in a reaction media comprising at least one member selected from the group of tetramethyl ammonium chloride, polypropylene and polyethylene glycol and polyethylene glycol to which a redox initiator is added.

18. The method of claim 17 defined further to include a dispersant in said reaction media.

19. The method of claim 17 wherein said reaction is defined further to be performed at a temperature in the range of from about 20 to about 60° C.

* * * * *